(12) United States Patent
Leggette et al.

(10) Patent No.: US 10,474,395 B2
(45) Date of Patent: Nov. 12, 2019

(54) ABSTRACTING NAMESPACE MAPPING IN A DISPERSED STORAGE NETWORK THROUGH MULTIPLE HIERARCHIES

(71) Applicant: International Business Machines Corporation, Armonk, NY (US)

(72) Inventors: Wesley B. Leggette, Chicago, IL (US); Manish Motwani, Chicago, IL (US); Jason K. Resch, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 192 days.

(21) Appl. No.: 15/439,229

(22) Filed: Feb. 22, 2017

(65) Prior Publication Data
US 2017/0161205 A1 Jun. 8, 2017

Related U.S. Application Data

(63) Continuation-in-part of application No. 15/400,529, filed on Jan. 6, 2017, which is a continuation-in-part
(Continued)

(51) Int. Cl.
*G06F 3/06* (2006.01)
*G06F 11/10* (2006.01)
(Continued)

(52) U.S. Cl.
CPC ............ *G06F 3/067* (2013.01); *G06F 3/0607* (2013.01); *G06F 3/0635* (2013.01);
(Continued)

(58) Field of Classification Search
CPC .................. H04L 29/08549; H04L 67/1097
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Charles Rones
*Assistant Examiner* — Andrew Russell
(74) *Attorney, Agent, or Firm* — Garlick & Markison; Timothy W. Markison; Harry S. Tyson, Jr.

(57) ABSTRACT

Methods for use in abstracting the addressing namespace of a dispersed storage network (DSN). In various examples, controllers are arranged hierarchically in a plurality of levels, where each level includes one or more groups of peer controllers, and each group of controllers shares a common parent controller at a next higher level. An addressing scheme is established for each group of controllers and the common parent controller. When a controller receives a request from a parent controller, and a higher level address of the request indicates that the request is to be serviced by a device at a lower level, the controller translates the higher level address to a lower level address, identifies a child controller associated with the lower level address, and generates a translated request including the lower level address and an identifier of the child controller. Responses are likewise translated and forwarded to the next higher level.

20 Claims, 6 Drawing Sheets

Related U.S. Application Data of application No. 13/866,457, filed on Apr. 19, 2013, now Pat. No. 9,632,872.

(60) Provisional application No. 61/655,753, filed on Jun. 5, 2012.

(51) Int. Cl.
*H04L 29/08* (2006.01)
*G06F 11/30* (2006.01)

(52) U.S. Cl.
CPC ...... *G06F 11/1076* (2013.01); *G06F 11/3034* (2013.01); *G06F 11/3055* (2013.01); *H04L 67/1097* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,069,468 B1* | 6/2006 | Olson | G06F 11/2092 714/4.2 |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0180041 A1* | 8/2007 | Suzuoki | H04L 67/1097 709/207 |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0059697 A1* | 3/2008 | Sakaki | G06F 3/0604 711/112 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

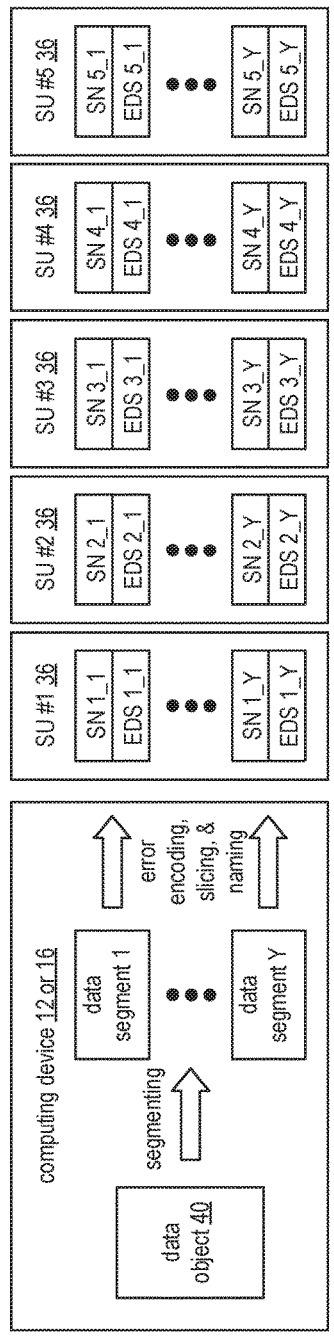
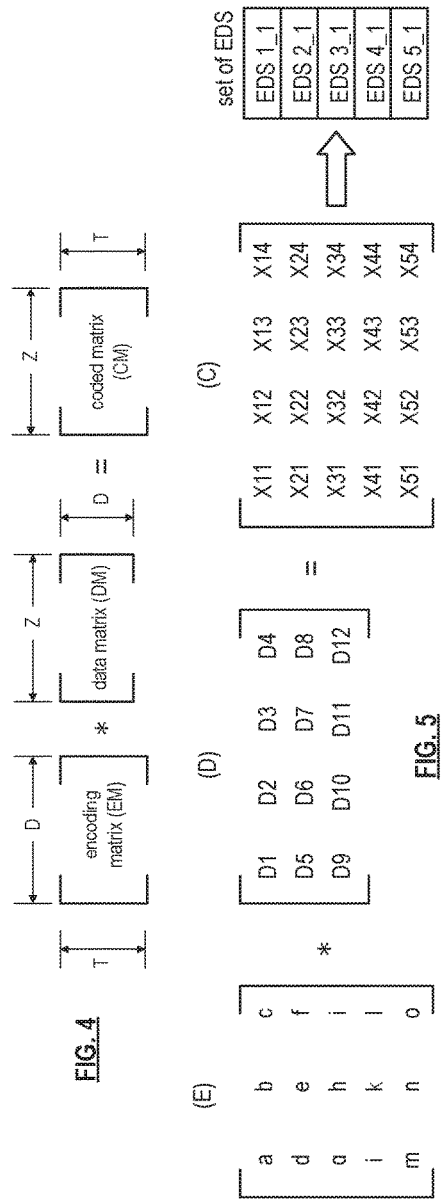
FIG. 3
FIG. 4
FIG. 5
FIG. 6

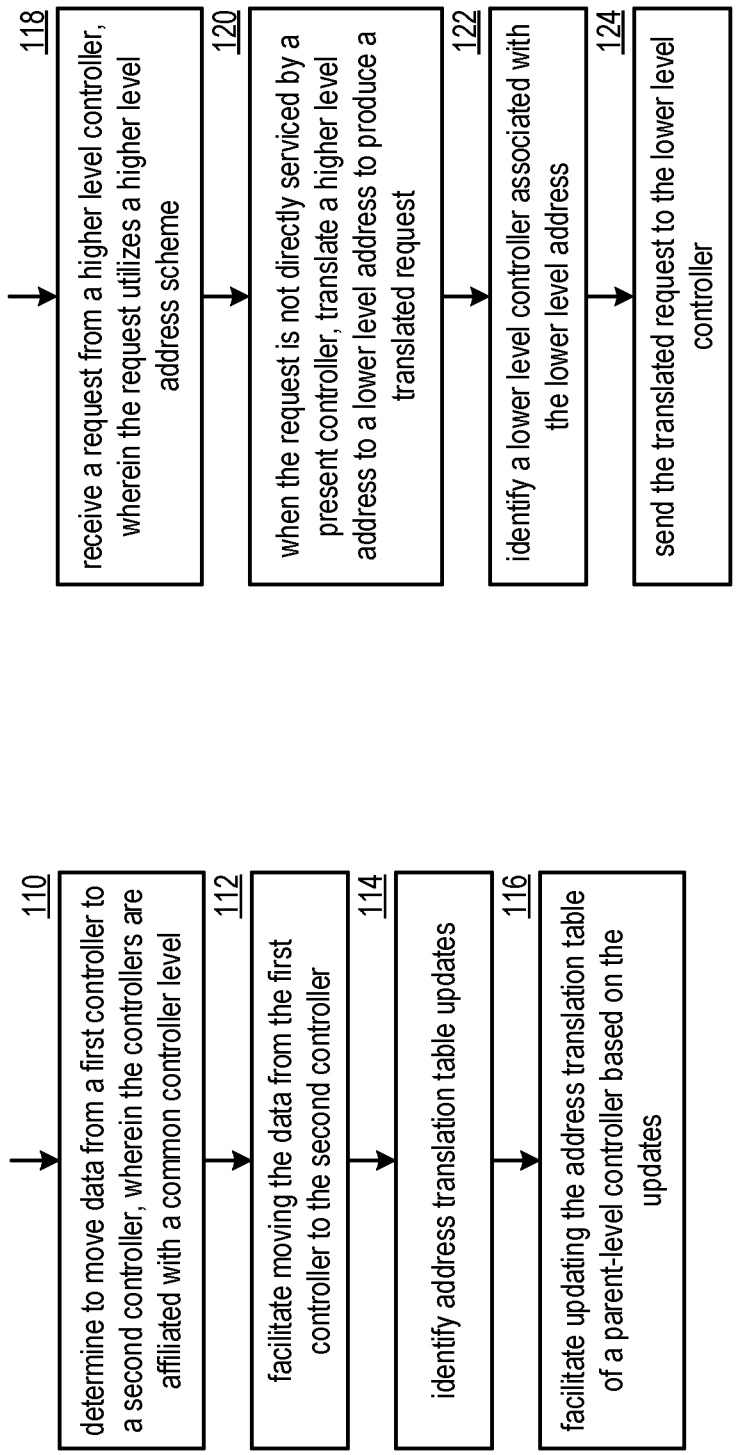

ABSTRACTING NAMESPACE MAPPING IN A DISPERSED STORAGE NETWORK THROUGH MULTIPLE HIERARCHIES

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/400,529, entitled "AUTOMATIC NAMESPACE ORDERING DETERMINATION," filed Jan. 6, 2017, which claims priority pursuant to 35 U.S.C. § 120 as a continuation-in-part of U.S. Utility application Ser. No. 13/866,457, entitled "REPRIORITIZING PENDING DISPERSED STORAGE NETWORK REQUESTS," filed Apr. 19, 2013, which claims priority pursuant to 35 U.S.C. § 119(e) to U.S. Provisional Application No. 61/655,753, entitled "ESTABLISHING AN ADDRESS RANGE ASSIGNMENT IN A DISTRIBUTED STORAGE AND TASK NETWORK," filed Jun. 5, 2012, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to hierarchical addressing in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

FIG. 10 is a logic diagram illustrating an example of migrating data in accordance with the present disclosure; and FIG. 11 is a logic diagram illustrating an example of facilitating access of data in accordance with the present disclosure.

DETAILED DESCRIPTION OF THE INVENTION

Figure 1:
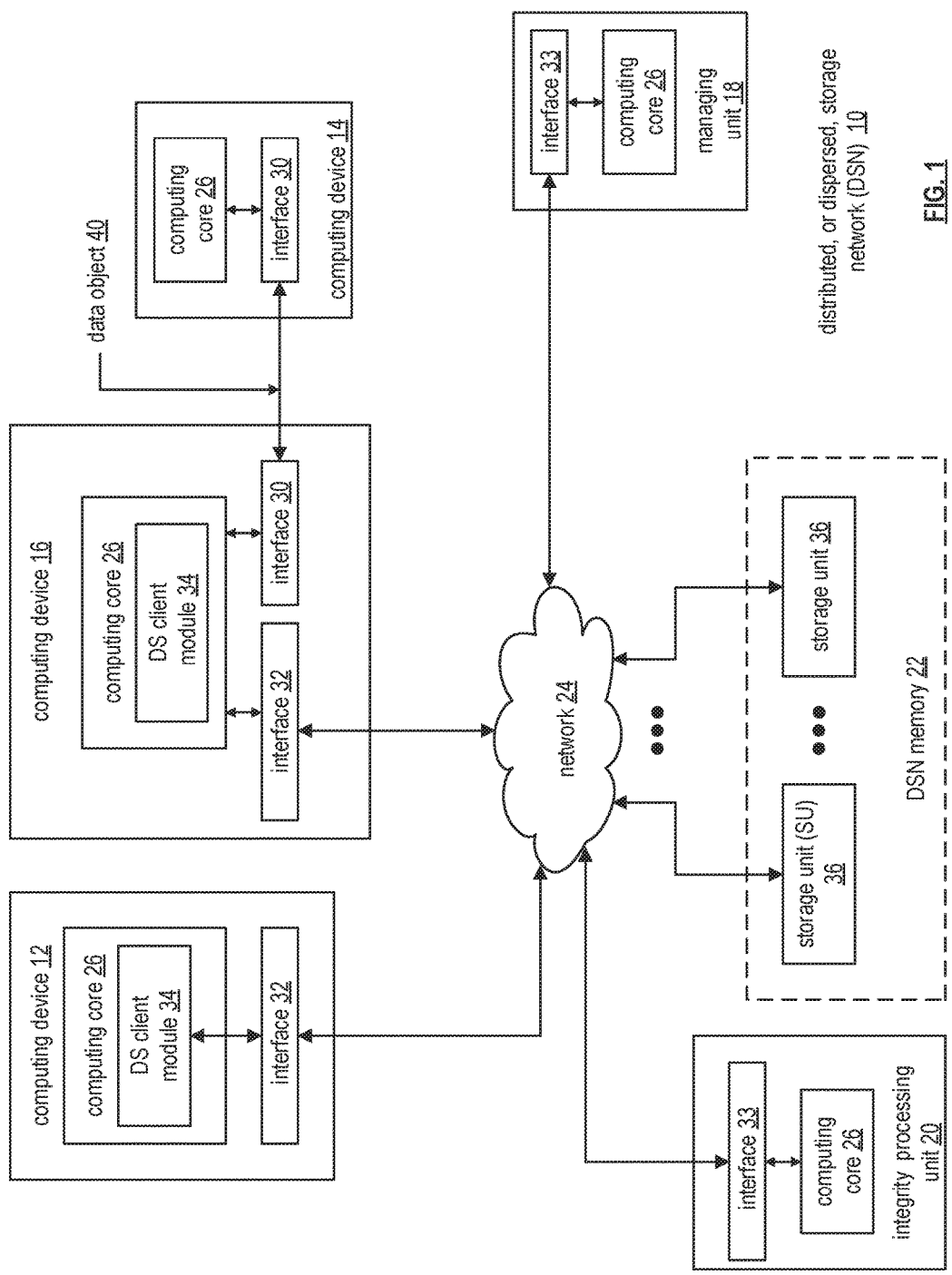
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
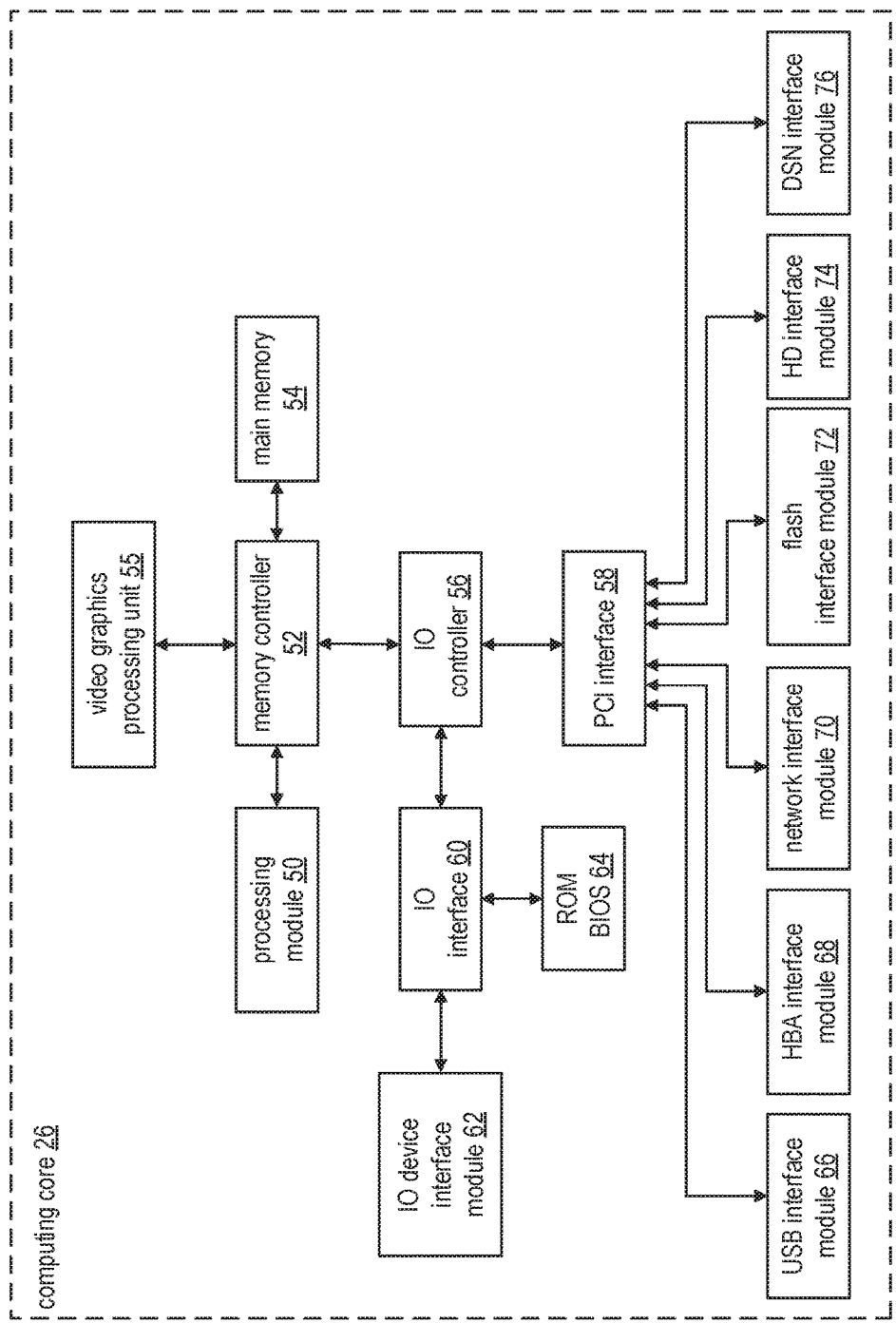
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of load balancing, service differentiation and dynamic resource selection for data access operations are discussed in greater detail with reference to FIGS. 9-13.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+ cD10, . . . X53=mD3+nD7+oD11, and X54=mD4+nD8+ oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
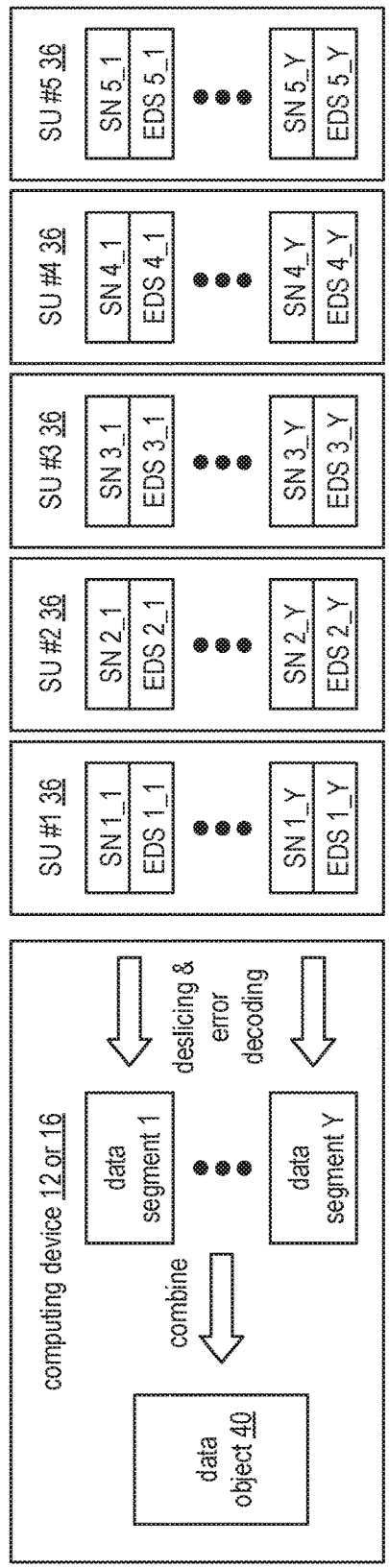
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
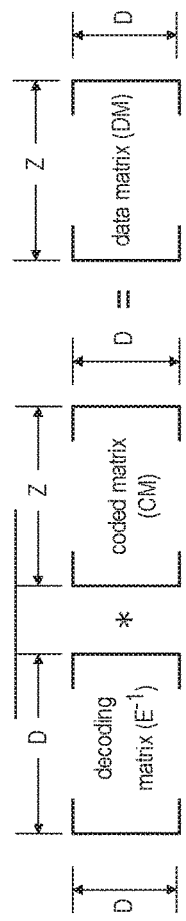
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In general, DSN memory stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

Figure 9:
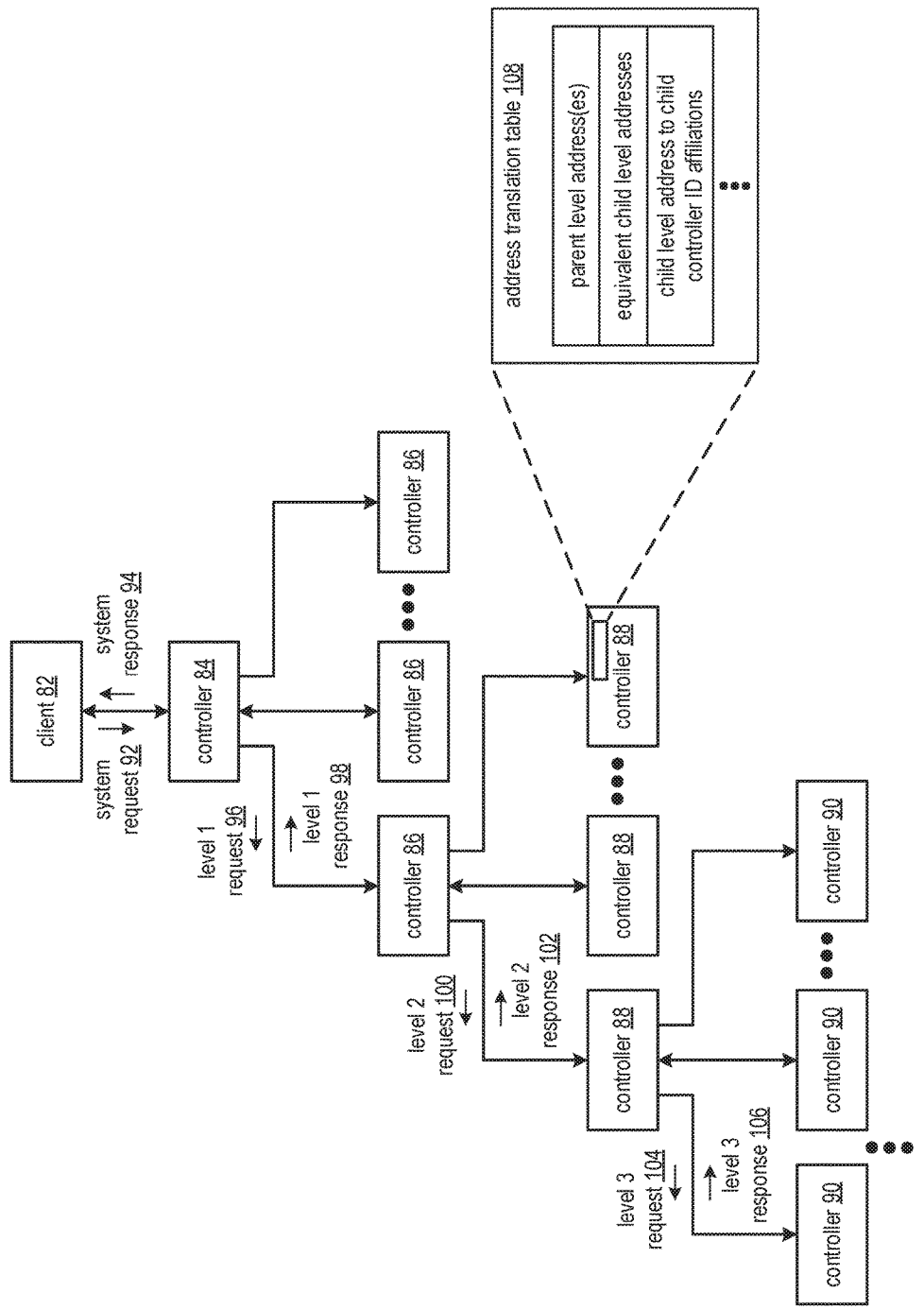
FIG. 9 is a schematic block diagram of another embodiment of a DSN utilizing multiple hierarchies and address range assignment abstraction in accordance with the present disclosure.

In the novel examples described in conjunction with FIGS. 9 and 10, a series of levels (or hierarchies) is established to abstract and simplify the addressing namespace of a DSN. At each level of the namespace of a given hierarchy, a "controller" is responsible for tracking the range/device mapping for a next lower level. Data migrations that occur at the next lower level only need to be communicated to the controller at the next highest level ("parent controller") such that levels above the parent controller are generally unaware of the migrations occurring below. For example, a DSN memory may have five levels: sites, containers, racks, storage units, and memory devices. A "site controller" may instruct a client regarding a particular container should service a request, or it may proxy the request for the client and send the request to the appropriate container. In this example, the site controller only is responsible for knowing the addressing namespace range for each container below it in the hierarchy. A request, once received by a container controller, is then routed to the rack controller which is responsible for the relevant address range, and the rack controller in turn routes the request to the storage unit responsible for the range. The storage unit then determines which of its memory devices is responsible for servicing the request. Note that data migrations may occur between memory devices of a storage unit without notifying higher levels, data migrations may occur between storage units with notification to only a rack controller, and so on.

Referring now to FIG. 9, a schematic block diagram of a DSN utilizing multiple hierarchies and address range assignment abstraction in accordance with the present disclosure is shown. The illustrated distributed computing system includes a client 82 and a plurality of controllers 84-90. The client 82 may be implemented utilizing at least one of a user device, a computing device 16, s storage unit 36, a managing unit 18, and an integrity processing unit 20. Each controller 84-90 may be implemented utilizing at least one of a computing device 16, a managing unit 18, and a storage unit(s) 36. Each controller 84-90 may include one or more of a computing core 26, memory for storing one or more of slices and error encoded slices, and a DS client module 34. The controllers 84-90 may be located at a same physical location (site) or located at multiple physical locations without departing from the technology as described herein.

The plurality of controllers 84-90 may be arranged in a plurality of levels, where each level includes one or more groups of peer controllers, where each group of controllers shares a common parent controller at a higher level. A controller may function as a parent controller when the controller is associated with one or more child controllers at a lower level and/or as a child controller when the controller is associated with a parent controller. The plurality of controllers 84-90 may be utilized to access a plurality of sets of slices including accessing slices within a controller and to facilitate access to slices in another controller. Each slice of the plurality of sets of slices is associated with a slice name. Each level of the plurality of levels may utilize a unique naming scheme or naming convention for slice names such that a parent controller and a group of child controllers utilize a common naming scheme. A child controller of the group of child controllers may utilize a second unique naming scheme with reference to a further group of child controllers with respect to the child controller when the child controller is also a parent controller for the next lower level of the plurality of levels. As used in this context, the term "group" may include a singular controller (e.g., a given level includes only one controller) or controllers from overlapping groups.

Each controller of the plurality controllers 84-90 may execute naming scheme translation to facilitate slice access and to facilitate data migration. Each controller of the plurality of controllers 84-90 may maintain an address translation table 108 that includes one or more of a parent level address, an equivalent child level address, and a child level address to child controller identifier (ID) affiliation. In an example of accessing data, the client 82 sends a system request 92 to a first level controller 84, where the system request 92 includes a data ID of the data. The first level controller 84 accesses an associated address translation table 108 utilizing the data ID to identify an equivalent child level address utilizing the data ID as a parent level address.

Next, the first level controller 84 identifies one or more child controllers based on the child level address. The first level controller 84 translates the system request to a level 1 (access) request 96, where the level 1 request 96 includes the child level address and an identifier of the one or more child controllers. The first level controller 84 sends the level 1 request 96 to the one or more child controllers. A second level controller 86 of the one or more child controllers accesses an associated address translation table 108 utilizing the child level address to identify an equivalent further child level address utilizing the child level address as a parent level address. Next, the second level controller 86 identifies one or more further child controllers based on the further child level address. The second level controller 86 translates the level 1 request to a level 2 request 100, where the level 2 request 100 includes the further child level address and an identifier of the one or more further child controllers. The second controller 86 sends the level 2 request 100 to the one or more further child controllers.

The process continues (e.g., through controller 88, via a level 3 request 104 to controller 90, etc.) until a controller that is associated with the slice of the data receives an access request and generates and sends an access response back up through the levels to the client, where the controllers at each level retranslate child level addresses into parent level addresses, etc. For example, controller 90 issues a level 3 response 106 to controller 88, controller 88 issues a level 2 response 102 to controller 86, controller 86 issues a level 1 response 98 to controller 84, and controller 84 issues a system response 94 to the client 82. Each controller of the plurality controllers at any level may be associated with a slice of a data access request. The controller may respond (e.g., process the request, generate a response, and output the response) to a slice access request when the controller is associated with the slice. The controller forwards a request and related response when the controller is not associated with the slice.

Translation of a request (or response) from one level to another level need not necessarily involve modification of the request. For example, a level 1 controller may receive a system access request including a slice name "FOO". The level 1 controller may consult an associated namespace mapping (e.g., such as maintained in an address translation table 108) to determine further routing of the request. In this generic example, the namespace mapping might be divided among three slice name ranges: "A--" to "L--", "M--" to "S--", and "T--" to "Z--". Since "FOO" falls within the first range, the request would be routed to a lower lever controller responsible for the first range. In turn, the namespace mapping utilized by the lower level controller may have further subdivisions, such as "A--" to "EM-", "EN-" to "G--", and "H--" to "L--". If the lower level controller is not directly responsible for processing of the request, it forwards the request to a still lower level controller responsible for the second range encompassing "FOO" for further processing. In this instance, the request has been translated at two levels without modification to the slice name.

A parent controller at any level of the plurality of levels may facilitate migrating data (e.g., one or more encoded data slices of a set of encoded data slices, task-related information, etc.) from one or more source child controllers to one or more destination/peer child controllers without notifying or updating controllers at other levels. For example, a third level parent controller may facilitate migration of a first group of slices from a second child controller to a fourth child controller. Facilitating the migration includes one or more of moving the group of slices from the second child controller to the fourth child controller and updating an associated address translation table 108 to indicate that the first group of slices are associated with the fourth child controller and disassociated with the second child controller. The third level parent controller subsequently facilitates access to the first group of slices by utilizing the fourth child controller.

FIG. 10 is a logic diagram illustrating an example of migrating data in accordance with the present disclosure. The illustrated method begins at step 110 where a processing module (e.g., of DS client module of a controller) determines to move data from a first controller to a second controller, where the first and second controllers are affiliated with a common controller level. The determination may be based on one or more of receiving a data migration request, detecting a migration, receiving an error message, receiving a rebuilding request, and detecting a unfavorable capacity utilization level associated with the first controller.

The method continues at step 112 where the processing module facilitates moving the data from the first controller to the second controller. For example, the processing module may generate and send a data transfer request and migrate the data. Migrating the data may include retrieving the data from the first controller and sending the data to the second controller for storage therein. The method continues at step 114 where the processing module identifies address translation table updates relating to the data migration. For example, the processing module may determine such updates by identifying the second controller and one or more addresses associated with the data. The method continues at step 116 where the processing module facilitates updating of the address translation table of a parent level controller based on the updates. For example, the processing module may identify the parent level controller (e.g., via a query or a lookup operation), retrieve at least a portion of the relevant address translation table, modify the portion of the table based on the updates to produce a modified portion, and store the modified portion in the address translation table of the identified parent level controller.

FIG. 11 is a logic diagram illustrating an example of facilitating access of data in accordance with the present disclosure. The illustrated method begins at step 118 where a processing module (e.g., of a DS client module of a controller) receives a request (e.g., a data access request) from a higher level controller, where the request utilizes a higher level addressing scheme (e.g., that of a parent controller). When the request is not directly serviced by a present controller, the method continues at step 120 where the processing module translates a higher level address to a lower level address to produce a translated request. The processing module may determine whether the present controller shall service the request based on an address translation table lookup maintained or accessible by the controller. For example, the processing module indicates that the request is not directly serviced by the present controller when the address translation table lookup indicates that the lower level address associated with a higher level address of the request is not affiliated with the present controller (e.g., it is affiliated with one or more controllers on a still further lower level, no controller identifier is affiliated with the lower level controller, etc.). Translating the address includes accessing the address translation table to extract (or otherwise identify) the lower level address associated with the higher level address and generating the translated request to include the lower level address (if the lower level address is not already part of the request).

The method continues at step 122 where the processing module identifies a lower level controller associated with the lower level address. Such identification includes accessing the relevant address translation table to extract a lower level container/controller identifier affiliated with the lower level address. The method continues at step 124 where the processing module sends the translated request to the lower level controller. For example, the processing module outputs the translated request utilizing a lower level container/controller identifier. The method of steps 118-124 may be repeated for multiple hierarchical levels until the data access operation is completed.

The methods described above in conjunction with the processing module can alternatively be performed by other modules (e.g., DS client modules 34) of the dispersed storage network or by other computing devices. Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of a computing device of a dispersed storage network (DSN), the computing device operable as a controller in a hierarchical arrangement of controllers, the method comprises:
receiving a data access request from a parent controller of the hierarchical arrangement of controllers, the data access request including a higher level address;
determining, based on the higher level address, that the data access request is not directly serviced by the computing device;
in response to determining that the data access request is not directly serviced by the computing device, translating the higher level address to a lower level address, wherein the lower level address is one of a plurality of addresses of an addressing namespace associated with a respective plurality of controllers configured as child controllers to share a common parent controller;
identifying a child controller associated with the lower level address;
generating a translated data access request to include the lower level address and an identifier of the child controller; and
sending the translated data access request for receipt and processing by the child controller.

2. The method of claim 1 further comprises:
receiving, from the child controller, a data access response relating to processing of the translated data access request;
generating a translated data access response to include address information for the parent controller; and
forwarding the translated data access response for receipt by the parent controller.

3. The method of claim 1, wherein translating the higher level address to a lower level address includes:
accessing an address translation table to extract the lower level address corresponding to the higher level address and identify the child controller associated with the lower level address, wherein the address translation table is maintained by the computing device.

4. The method of claim 3, wherein the address translation table includes one or more of:
a parent level address;
an equivalent child level address; or
a child level address to child controller identifier affiliation.

5. The method of claim 1, wherein determining, based on the higher level address, that the data access request is not directly serviced by the computing device includes:
accessing an address translation table to extract the lower level address corresponding to the higher level address; and
determining that the lower level address is affiliated with a controller on a further lower level.

6. The method of claim 1, wherein the parent controller is a client device, and wherein the higher level address comprises a data identifier.

7. The method of claim 1 further comprises:
translating the higher level address to a plurality of lower level addresses;
identifying a plurality of child controllers associated with the plurality of lower level addresses;
generating a plurality of translated data access requests, each of the translated data access requests including a lower level address of the plurality of lower level addresses; and
sending the plurality of translated data access requests for receipt and processing by the plurality of child controllers.

8. The method of claim 1 further comprises:
moving data between the child controller and a peer child controller, the computing device operable as a parent controller to both the child controller and the peer child controller; and
modifying an address translation table maintained by the computing device to reflect a current location of the data in the peer child controller.

9. A distributed storage network (DSN) including:
a plurality of computing devices configured as a plurality of controllers, the plurality of controllers arranged hierarchically in a plurality of levels, where each level includes one or more groups of peer controllers, wherein each group of controllers shares a common parent controller at a next higher level, each group of controllers and a respective common parent controller utilizing a common addressing namespace, and wherein a controller of the plurality of controllers is configured to:
receive a data access request from a parent controller of the plurality of controllers, the data access request including a higher level address;
determine, based on the higher level address, that the data access request is not directly serviced by the controller;
in response to determining that the data access request is not directly serviced by the controller, translate the higher level address to a lower level address of the common addressing namespace;
identify a child controller associated with the lower level address;
generate a translated data access request to include the lower level address and an identifier of the child controller; and
send the translated data access request for receipt and processing by the child controller.

10. The distributed storage network (DSN) of claim 9, wherein the controller is further configured to:
receive, from the child controller, a data access response relating to processing of the translated data access request;
generate a translated data access response to include address information for the parent controller; and
forward the translated data access response for receipt by the parent controller.

11. The distributed storage network (DSN) of claim 9, wherein translating the higher level address to a lower level address includes:
accessing an address translation table to extract the lower level address corresponding to the higher level address and identify the child controller associated with the lower level address, wherein the address translation table is maintained by the controller.

12. The distributed storage network (DSN) of claim 11, wherein the address translation table includes one or more of:
a parent level address;
an equivalent child level address; or
a child level address to child controller identifier affiliation.

13. The distributed storage network (DSN) of claim 9, wherein determining, based on the higher level address, that the data access request is not directly serviced by the controller includes:
accessing an address translation table to extract the lower level address corresponding to the higher level address; and
determining that the lower level address is affiliated with a controller on a further lower level.

14. A computing device operable as a controller in a hierarchical arrangement of controllers of a dispersed storage network (DSN), the computing device comprises:
a network interface;
a local memory, the local memory maintaining an address translation table; and
a processing module operably coupled to the network interface and the local memory, wherein the processing module is configured to:
receive, via the network interface, a data access request from a parent controller of the hierarchical arrangement of controllers, the data access request including a higher level address;
determine, based on the higher level address, that the data access request is not directly serviced by the computing device;
in response to determining that the data access request is not directly serviced by the computing device, translate the higher level address to a lower level address, wherein the lower level address is one of a plurality of addresses of an addressing namespace associated with a respective plurality of controllers configured as child controllers to share a common parent controller;
identify a child controller associated with the lower level address;
generate a translated data access request to include the lower level address and an identifier of the child controller; and
send, via the network interface, the translated data access request for receipt and processing by the child controller.

15. The computing device of claim 14, wherein the processing module is further configured to:
receive, via the network interface, a data access response from the child controller relating to processing of the translated data access request;
generate a translated data access response to include address information for the parent controller; and
forward, via the network interface, the translated data access response for receipt by the parent controller.

16. The computing device of claim 14, wherein translating the higher level address to a lower level address includes:
accessing the address translation table to extract the lower level address corresponding to the higher level address and identify the child controller associated with the lower level address.

17. The computing device of claim 16, wherein the address translation table includes one or more of:
a parent level address;

an equivalent child level address; and a child level address to child controller identifier affiliation.

18. The computing device of claim 14, wherein determining, based on the higher level address, that the data access request is not directly serviced by the computing device includes:

accessing the address translation table to extract the lower level address corresponding to the higher level address; and determining that the lower level address is affiliated with a controller on a further lower level.

19. The computing device of claim 14, wherein the higher level address comprises a data identifier.

20. The computing device of claim 14 operable as a parent controller to both the child controller and a peer child controller, wherein the processing module is further configured to:

receive, via the network interface, a notification that data has been migrated between the child controller and the peer child controller; and modify the address translation table in response to the notification to reflect a current location of the data in the peer child controller.

* * * * *